United States Patent
Bar-Or et al.

(10) Patent No.: US 9,839,028 B2
(45) Date of Patent: Dec. 5, 2017

(54) CARRIER AGGREGATION CONTROLLER AND METHOD

(71) Applicants: Amit Bar-Or, Nes-Ziona (IL); Guy Drory, Givaataim (IL); Gideon Kutz, Ramat-Hasharon (IL); Ran Zamir, Ramat-Gan (IL)

(72) Inventors: Amit Bar-Or, Nes-Ziona (IL); Guy Drory, Givaataim (IL); Gideon Kutz, Ramat-Hasharon (IL); Ran Zamir, Ramat-Gan (IL)

(73) Assignee: NXP USA, Inc., Austin, TX (US)

( * ) Notice: Subject to any disclaimer, the term of this patent is extended or adjusted under 35 U.S.C. 154(b) by 177 days.

(21) Appl. No.: 14/897,759

(22) PCT Filed: Jun. 18, 2013

(86) PCT No.: PCT/IB2013/054989
§ 371 (c)(1),
(2) Date: Dec. 11, 2015

(87) PCT Pub. No.: WO2014/203033
PCT Pub. Date: Dec. 24, 2014

(65) Prior Publication Data
US 2016/0143012 A1 May 19, 2016

(51) Int. Cl.
*H04W 72/04* (2009.01)
*H04L 27/26* (2006.01)
*H04L 5/00* (2006.01)

(52) U.S. Cl.
CPC ......... *H04W 72/044* (2013.01); *H04L 5/001* (2013.01); *H04L 27/2636* (2013.01)

(58) Field of Classification Search
None
See application file for complete search history.

(56) References Cited

U.S. PATENT DOCUMENTS 6,263,027 B1 * 7/2001 Yang ..................... H03C 3/40
375/302
6,760,300 B1 * 7/2004 Eberle .................. H04L 5/0048
370/210

(Continued)

OTHER PUBLICATIONS

International Search Report and Written Opinion correlating to PCTIIB2013/054989 dated Feb. 21, 2014.

(Continued)

*Primary Examiner* — Faruk Hamza
*Assistant Examiner* — Cassandra Decker (57) ABSTRACT

A carrier aggregation controller for providing an aggregated baseband signal from a plurality of baseband signals is provided. The controller comprises an accumulating memory, a selector and a time domain transformer. The selector is configured to add at least a first list of frequency domain samples obtained for the first baseband signal to first consecutive locations in the accumulating memory centered at a first preset location associated with the first baseband signal, and a second list of frequency domain samples obtained for the second baseband signal to second consecutive locations in the accumulating memory centered at a second preset location associated with the second baseband signal. The time domain transformer is configured to apply at least an inverse discrete Fourier transform to the frequency domain samples accumulated in the accumulating memory, obtaining the aggregated baseband signal.

17 Claims, 6 Drawing Sheets

(56) References Cited

U.S. PATENT DOCUMENTS

| | | | |
|---|---|---|---|
| 8,351,359 B2 | 1/2013 | Heo et al. | |
| 8,532,047 B2 | 9/2013 | Nguyen et al. | |
| 2006/0256883 A1* | 11/2006 | Yonge, III | H04L 27/2608 |
| | | | 375/260 |
| 2009/0239486 A1 | 9/2009 | Sugar et al. | |
| 2013/0034056 A1 | 2/2013 | Kishiyama et al. | |
| 2013/0044667 A1 | 2/2013 | Han et al. | |
| 2013/0044686 A1* | 2/2013 | Yen | H04W 56/00 |
| | | | 370/328 |
| 2014/0307597 A1 | 10/2014 | Kim et al. | |

OTHER PUBLICATIONS

Jim Zyren, Jim Zyren, Dr. Wes McCoy, Technical Editor, Freescale, 'Overview of the 3GPP Long Term Evolution Physical Layer'.
Application Note 1298, Agilent Technologies, 'Agilent Digital Modulation in Communications Systems—An Introduction'.
Jinfeng Du, Svante Signell, 'Classic OFDM Systems and Pulse Shaping OFDM/OQAM Systems' Feb. 2007, Electronic, Computer, and Software Systems, Information and Communication Technology. KTH—Royal Institute of Technology, SE-100 44 Stockholm, Sweden.
Jeanette Wannstrom, 'LTE-Advanced by, for 3GPP', May 2012.
Andrew Temple, 'MSC8156 Ethernet Interface QUICC Engine Ethernet Programming', Jun. 21 2010, NMG DSP Applications.
3GPP, Carrier Aggregation for LTE V0.0.4, ETSI MCC.

* cited by examiner

CARRIER AGGREGATION CONTROLLER AND METHOD

FIELD OF THE INVENTION

This invention relates to a carrier aggregation controller. The invention further relates to a method for providing an aggregated baseband signal. The invention further relates to a computer program.

BACKGROUND OF THE INVENTION

Some standards of wireless telecommunications technology, e.g., used for mobile devices, mobile telecommunication services, networks and the like, may use carrier aggregation. Carrier aggregation may be of contiguous and non-contiguous spectrum allocations.

Aggregation has, for example, been introduced in LTE-Advanced. Carrier aggregation increases capacity by adding more bandwidth. The individual component carriers can be of different bandwidths.

For example, U.S. Pat. No. 8,351,359 'Reporting power headroom for aggregated carriers', incorporated herein by reference, discloses that in LTE-A, carrier aggregation might be used in order to support wider transmission bandwidths and hence increase the potential peak data rate to meet LTE-A requirements. An example is disclosed in which a mobile phone may receive or transmit on a multiple of up to five component carriers depending on its capabilities; each component carrier has a width of 20 MHz and the total system bandwidth becomes 100 MHz. In addition, depending on the deployment scenario, carrier aggregation may occur with carriers located in the same band and/or carriers located in different bands. For example, one carrier may be located at 2 GHz and a second aggregated carrier may be located at 800 MHz.

SUMMARY OF THE INVENTION

The present invention provides a carrier aggregation controller, an integrated circuit, a base station, a method for providing an aggregated baseband signal, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1A:
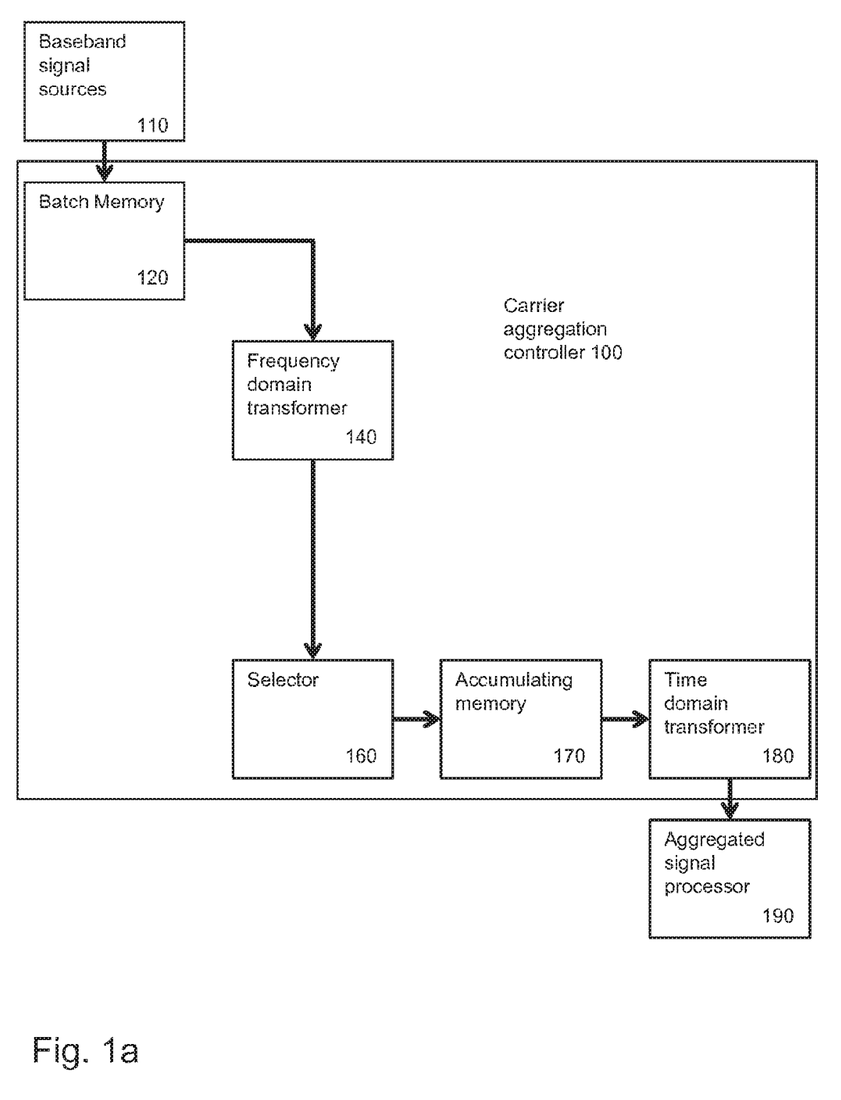
FIG. 1a schematically shows an example of an embodiment of a carrier aggregation controller, FIG. 1b schematically shows an another example of an embodiment of a carrier aggregation controller, FIG. 2 schematically shows an example of an embodiment of an integrated circuit, FIG. 3 schematically illustrates carrier aggregation, FIG. 4 schematically shows another example of an embodiment of a carrier aggregation controller, FIG. 5 schematically shows an example of a method of providing an aggregated baseband signal, FIG. 6 schematically shows an exemplary user interaction system.

FIG. 1a schematically shows an example of an embodiment of a carrier aggregation controller 100. Carrier aggregation controller 100 comprises a batch memory 120. Carrier aggregation controller 100 is configured to receive a plurality of baseband signals, e.g., from baseband signal sources 110. Baseband signal sources 110 may be a processor that produces the plurality of baseband signals. The number of baseband signals in the plurality of baseband signals is denoted with L.

For example the baseband signals in the plurality of baseband signals may, so called equivalent baseband signals, also known as equivalent low pass signals. These baseband signals may be represented as a stream of complex values, which are a representation of the modulated physical signal (the so called passband signal or RF signal). Equivalent baseband signals are suitable for, e.g., analog and digital modulation methods with constant carrier frequency (for example ASK, PSK and QAM). In an embodiment, the baseband signals in the plurality of baseband signals are digital stream of complex numbers; the complex numbers may be represented by a pair digital numbers representing the real and imaginary parts.

The equivalent baseband signal may be $Z(t)=I(t)+jQ(t)$ where $I(t)$ is the in-phase signal, $Q(t)$ the quadrature phase signal, and $j$ the imaginary unit. In a digital modulation method, the $I(t)$ and $Q(t)$ signals of each modulation symbol may be obtained from the constellation diagram. The frequency spectrum of this signal may include negative as well as positive frequencies. The physical passband signal corresponds to $I(t)\cos(\omega t)-Q(t)\sin(\omega t)=Re\{Z(t)ej\omega t\}$, wherein $\omega$ is the carrier angular frequency in rad/s.

Figure 3:
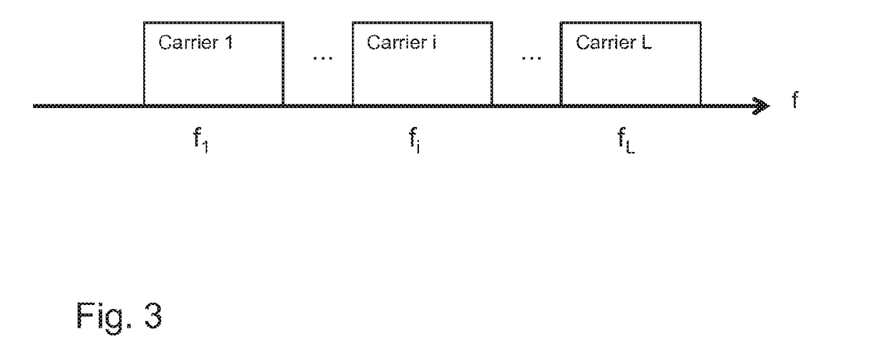

Carrier aggregation is an operation which may be used in various wireless communication systems, e.g. 3G and 4G. In aggregation each of the carrier signals of the plurality of baseband signal is centered at a desired frequency, such that the carriers will be separated from each other in the frequency domain. This concept is illustrated in FIG. 3. FIG. 3 shows an exemplifying carrier aggregated baseband signal in the frequency domain. Each of the carrier signals of FIG. 3 are centered at a different frequency $f_i$. The carriers may be spaced such that their signals are separated in the frequency domain. For example, the plurality of baseband signals are associated with a plurality of central frequencies ($f_i$), the aggregated baseband signal comprising the plurality of baseband signals centered at the plurality of central frequencies. The aggregated signal may still be baseband. For example, the aggregated signal may be centered at a frequency of 0. Note that the plurality of baseband signals may be positioned at frequencies such that the signals are contiguous and non-contiguous.

Carrier aggregation controller 100 comprises a batch memory 120. The baseband signals are batched at carrier aggregation controller 100 in batch memory 120. For example, the plurality of baseband signal may be received as a plurality of baseband signal streams. The streams are streams of digital complex values, also referred to as sample values. The complex values are buffered in batch memory 120 separate for each baseband signal. It is convenient for implementation if all the baseband signals have the same sample rate but this is not necessary. Before storing or during storage in batch memory 120, a sample may be processed, examples of which are provided below.

For example, the batch memory 120 may receive consecutive samples of the baseband signals in the plurality until the number of batched samples equals a preset batch-number (B). The batch-number (B) is a parameter that may be chosen depending on the desired aggregation. The batch-number may be different for the signals in the plurality, but typically the same batch-number will be used for all signals in the plurality of baseband signals.

Carrier aggregation controller 100 comprises a frequency domain transformer 140. Frequency domain transformer 140 is configured to apply a discrete Fourier transform (DFT) to consecutive samples of a baseband signal batched in batch memory 120. For example, carrier aggregation controller 100 may use a so-called 'B-point DFT', wherein B is the batch number. Such a DFT produces a number of frequency domain samples equal to the batch-number (B). In an embodiment, batch memory 120 batches, i.e., buffers, complex values of the plurality of signal received by carrier aggregation controller 100, until a batch-number of consecutive samples is available for each of the plurality of baseband signals. In the latter case, frequency domain transformer 140 may be applied to all of the baseband signals of the plurality. In that case, there are (L×B) samples obtained from the plurality of baseband signals before applying frequency domain transformer 140, and (L×B) frequency domain samples after applying frequency domain transformer 140. Carrier aggregation controller 100 may even obtain some or all of the frequency domain samples from other sources than frequency domain transformer 140. In that case carrier aggregation controller 100 need not apply frequency domain transformer 140 to all of the baseband signals. For simplicity, we will assume that frequency domain transformer 140 is applied to all of the plurality of baseband signals; so that each signal of the plurality of baseband signals that will be aggregated into the aggregated carrier signal has a corresponding set of frequency domain samples.

Carrier aggregation controller 100 comprises an accumulating memory 170 and a selector 160. Note that additional aggregation may take place before or after carrier aggregation controller 100. Such additional aggregation may avoid Fourier transforms entirely, e.g., by aggregation in the time domain.

Selector 160 is configured to add the list of frequency domain samples obtained for a baseband signal, say, by frequency domain transformer 140, to consecutive locations in accumulating memory 170 centered at a preset location associated with that baseband signal. Carrier aggregation controller 100 and selector 160 are configured to do this for at least a first and second list of frequency domain samples obtained for a first and second baseband signal. The locations to which selector 160 adds the frequency domain samples for the first and second list respectively may, or may not overlap. In case there is no overlap and accumulating memory 170 has been reset to 0 before the selector performs its function, the adding reduces to copying the samples the output of frequency domain transformer 140 to the correct locations in accumulating memory 170.

In an embodiment, frequency domain transformer 140 is applied to a first batch of consecutive samples of a first one of the plurality of baseband signals, obtaining a first list of frequency domain samples. Selector 160 adds the first list to consecutive locations in the accumulating memory 170 centered at a first preset location associated with the first baseband signal. Similarly, frequency domain transformer 140 is also applied to a second batch of consecutive samples of a second one of the plurality of baseband signals, obtaining a second list of frequency domain samples. Selector 160 also adds the second list to consecutive locations in the accumulating memory 170 centered at a second preset location associated with the second baseband signal. The first list and second list may have some overlap in the accumulating memory, in which case the samples are added; the first list and second list may also have no overlap in the accumulating memory.

In an embodiment, the frequency domain transformer is configured so that the number of frequency domain samples in the first list equals the batch-number (B). In an embodiment, the frequency domain transformer is configured to produce a number of frequency domain samples in the first list equal the batch-number (B) and the number of frequency domain samples added by the selector in the accumulated memory equals the batch-number (B) per baseband signal.

Carrier aggregation controller 100 comprises a time domain transformer 180 configured to apply at least an inverse discrete Fourier transform to the accumulated frequency domain samples in the accumulating memory, obtaining the aggregated baseband signal. The locations of the accumulated memory may be reset to 0 before the adding of selector 160.

Aggregating of multiple baseband signals is thus accomplished by performing a DFT operation on the baseband signals, combining the transformed signals in a memory and performing an iDFT operation.

The locations in the accumulating memory are associated with a frequency ($f_j^b$) which is linearly dependent upon the location (j). By choosing the locations at which the frequency domain samples obtained for a signal of the plurality of baseband signals are added, the frequency of that signal in the aggregated signal may be controlled. For example, the frequency associated with locations in the accumulating memory may be dependent upon one or more of a sampling rate ($S_b$) of the plurality of baseband signals, the number of baseband signals in the plurality (L), and/or the number of samples in the first or second list (B). For example, the frequency ($f_j^b$) associated with a location j may equal $$-\frac{L \cdot S_b}{2} + j\frac{S_b}{B},$$

wherein the location is represented with a number j running from 0 to L·B−1.

The further use of the output of time domain transformer 180 has been represented in FIG. 1 by an aggregated signal processor 190. Aggregated signal processor 190 may include a modulator and possibly an antenna for using the output of time domain transformer 180 for modulating a (high frequency) carrier signal and eventually for transmission over the antenna. For example, the output of time domain transformer 180 may be used in a base station for wireless transmission; For example, base station configure for the LTE-A standard. The output of time domain transformer 180 may be further processed before transmission by aggregated signal processor 190. For example, carrier aggregation controller 100 may be comprised in a wireless communications station installed at a fixed location used to communicate as part of a wireless telephone system.

After a batch of the plurality of baseband signals buffered in batch memory 120 has been processed by frequency domain transformer 140, selector 160 and time domain transformer 180 a new batch of sample of the plurality of baseband signals may be processed. Interestingly, the buffering of received sample in the plurality of baseband signals may be in parallel with the processing of a previous batch. After the time domain transformer 180 has delivered the aggregated signal, e.g., by forwarding all or part of its results to a user of the aggregated signal, the aggregation memory may be reset to 0, e.g., by writing 0 to all locations, if so desired. The memory may also be overwritten; In case no overlap occurs between carriers this is only requires straightforward overwriting of aggregation memory. In case overlap does occur care must be taken that the first write to a memory cell overwrites the content, but next writes to a memory cell are additions.

Batch memory 120 may be configured so that consecutive batches of the same signal have an overlap of a preset overlap-size. For example, after the batch-number (B) of consecutive samples has been received in a first batch for one of the baseband signals in the plurality, processing may start for that signal, at least up to the selection. Indeed, when a batch-number (B) of consecutive samples has been received for all baseband signals in the plurality, the processing may be done up to time domain transformer 180, and beyond. When processing has started on a batch, a new batch may be collected. However, the new batch may start with an overlap with the previous batch. For example, this may be done by retaining a preset number of samples (O) of the first batch in the batch memory and to clear or ignore the remaining samples In case O samples are retained from a previous batch, we need to get (O–B) new samples from the baseband signal. Also, since the O samples are the last O samples from previous batch and they will be used as the first O samples of the current batch they will change their positions in the DFT input (140)—thus, if these O samples will remain in the same location in the memory the DFT should be able to read the input from 120 in cyclic manner starting from offset (B–O).

In case, an overlap is used in the incoming samples received in batch memory 120, a corresponding overlap may be used at the output of time domain transformer 180. For example, if a preset number of samples (O) of the batch were retained from a previous batch, then time domain transformer 180 may ignore a number of samples (L×O) of its output: that is only part of the output of time domain transformer 180 is forwarded, say to aggregated signal processor 190. The number of forwarded samples may be L×(B–O), in case all L signals in the plurality produce B samples accumulated in accumulating memory 170. Carrier aggregation controller 100 may comprise an output block selector for selecting the last L×(B–O) samples of the inverse DFT.

Memory 120 and 170 operate differently when they are cleared for use in a next batch. Memory 170 is reset entirely to 0, but memory 120 is cleared partially; In memory 120 the overlap samples are not cleared, but the rest is. This means that L×O samples are not cleared in memory 120, i.e., O samples for each of the L signals. In an implementation, memory 120 is organized as a cyclic memory or data structure, this avoids the need to copy the overlapping samples; The O samples that are retained are the most recently received samples, but in the next batch they function as the first O received samples. Without a cyclic memory organization, the overlapping samples would need to be copied from one end of memory 120 to another.

In one mode of operation, baseband signal sources 110 may produce L≥2 baseband signals which are buffered in batch memory 120. When B samples have been batched for a baseband signal, frequency domain transformer 140 applies a DFT to the samples, producing B samples in a frequency domain. A selector 160 adds the samples produced by frequency domain transformer 140 to particular positions in accumulating memory 170. The particular positions are determined based on the desired location in the spectrum of the baseband signal. Once all baseband signals have been processed in this way, i.e., batched by batch memory 120, DFTed by frequency domain transformer 140 and added-in by selector 160, then time domain transformer 180 performs an iDFT. In case, overlaps are used, only part of the output of time domain transformer 180 is forwarded to consumer of the aggregated signal, e.g., aggregated signal processor 190. For the new batch, only (B–O) new samples are needed per signal to create a new list of aggregated samples.

Figure 1B:
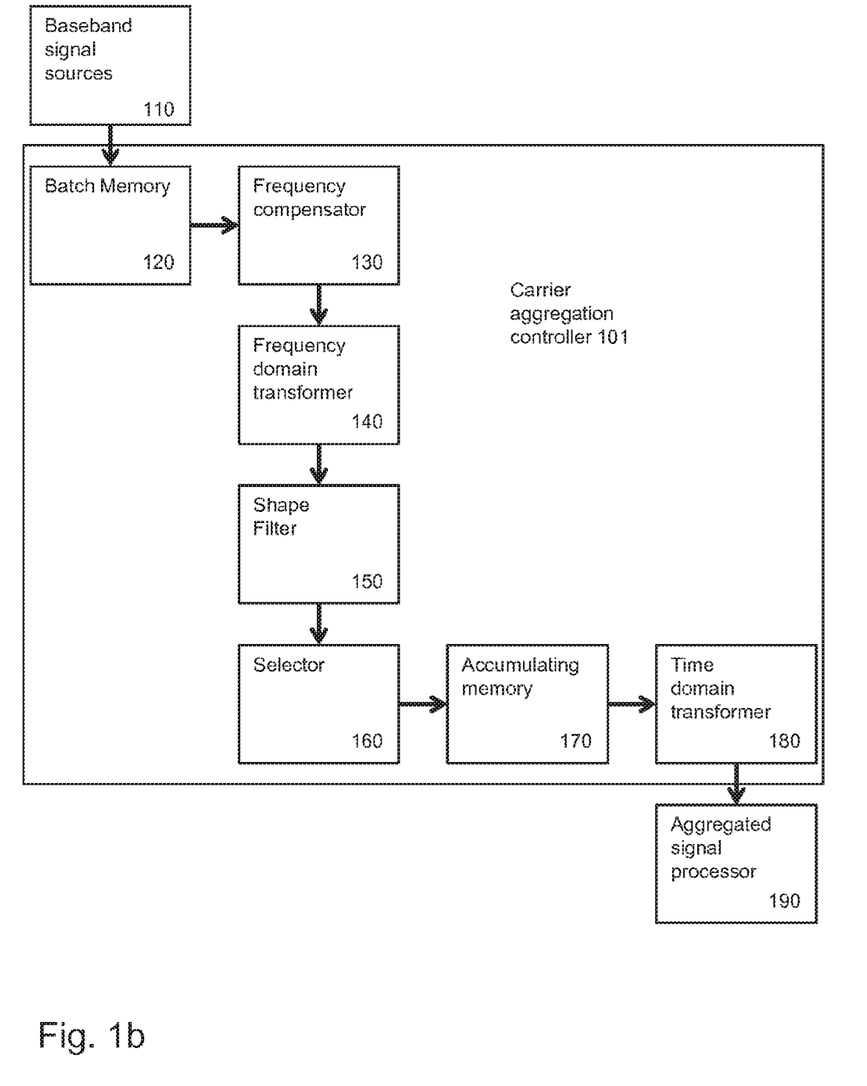

FIG. 1*b* schematically shows carrier aggregation controller 101, which is a refinement of carrier aggregation controller 100. Two additional features have been added to carrier aggregation controller 100, a frequency compensator 130 and a shape filter 150, e.g. for pulse shaping say to reduce interference between different carriers. These two features are optional, in an embodiment, shape filter 150 is omitted from carrier aggregation controller 101, but not frequency compensator 130. In an embodiment, frequency compensator 130 is omitted from carrier aggregation controller 101, but not shape filter 150. Frequency compensator 130 allows better control over the place in the spectrum of the baseband signals of the plurality. Shape filter 150 allows shape filtering in the frequency domain. In case a frequency compensator 130 is used and a shape filter 150, the shape filter 150 may be modified to cooperate with the frequency compensation.

The locations in accumulating memory 170 are associated with a frequency, e.g., a location j, running from 0 to L·B−1, may be associated with a frequency ($f_j^b$). This means, that without frequency compensation, a baseband signal may be placed at frequency ($f_j^b$) by adding the output of frequency domain transformer 140 for that baseband signal at locations in accumulating memory 170 centered at the position j. That is by selecting an appropriate position for a baseband signal in the plurality, its position in the aggregated spectrum may be selected. In an embodiment, a preset location is associated with each of the signals of the plurality; selector 160 being configured to add-in the output of frequency domain transformer 140 for a particular baseband signal at locations centered at the position (i.e. location) associated with that particular baseband signal.

However, more control over the placement of a baseband signal in the aggregated signal may be desired. In particular, a central frequency may be associated with one or more of the baseband signals in the plurality. The central frequency indicating the position of baseband signal i in the aggregated baseband signal is indicated with $f_i$. See FIG. 3 for a graphical illustration. If the $f_i$ happens to be equal to an $f_j^b$ for some j, then the baseband signal may be obtained at the desired central frequency without compensation by selection j as the preset location for that baseband signal. However, if no such j exists, or if some j cannot be selected for other reasons then a frequency compensator 130 may be used. The difference between the desired central frequency of baseband signal i ($f_i$) and the frequency associated with its preset location j ($f_i^b$) is referred to as the frequency compensation term $\Delta f_i$ of that baseband signal i.

Carrier aggregation controller 101 comprises a frequency compensator 130. Frequency compensator 130 is configured to add a multiple of the frequency compensation term to the phase of consecutive samples of the corresponding signal. The multiple is increasing with each consecutive sample. For example, incoming sample number n of baseband signal i may be multiplied by $e^{j2\pi\Delta f_i n}$ of that baseband signal i (note j is the imaginary unit in this equation); note that the multiple of $e^{j2\pi\Delta f_i}$ increases with n.

The carrier aggregation controller 101 is configured to apply the frequency compensator before applying the discrete Fourier transform 140. Frequency compensator 130 may be done before or after a received sample is stored in memory 120. For example, a batch of samples may be collected and then processed by frequency compensator 130 and frequency domain transformer 140 in turn; or frequency compensator 130 may be applied directly to an incoming sample, then stored in batch memory 120 and when a complete batch is available frequency domain transformer 140 is applied to the batch.

Frequency compensation may be done by frequency compensator 130 for all of the baseband signals of the plurality, or only for some. For example, some baseband signals may not need compensation. For example, carrier aggregation controller 101 may receive frequency domain samples from another source for some baseband signals obviating frequency domain transformer 140 and frequency compensator 130 for those signals.

Once frequency compensation is used, there is considerable freedom in choosing the preset location j since discrepancy between its associated frequency ($f_j^b$) and the desired central frequency may be overcome through compensation. Some preset locations j give a continuous output phase between blocks in the aggregate signal.

In an embodiment, the frequency compensation term is less than a preset margin in absolute value. For example, the margin may be chosen as half the sampling rate of the plurality of baseband signals, or half the sampling rate of the plurality of baseband signals ($S_b$) minus half a carrier bandwidth of the plurality of baseband signals (W); in the latter case no data folding of the residual signal occurs.

For example, the preset location, and thus the frequency associated with the preset location ($f_j^b$), the overlap-size, and the number of samples in the first or second list (B) are chosen so that a continuous output phase between blocks in the aggregate signal is obtained. This may be obtained, for example, by satisfying the requirement that the frequency associated with the first preset location ($f_j^b$) is chosen so that $$\frac{L \cdot (B - O) \cdot f_j^b}{R}$$

is an integer, wherein R represents a sampling rate of the plurality of baseband signals times the number of baseband signals in the plurality, i.e., $R = L \times S_b$. The latter may be more easily accomplished by choosing B a power of 2, and/or O a power of 2. For example, B=2048 and O=32 (many other parameters are possible).

Carrier aggregation controller 100 may also be refined with a shape filter 150, or as shown in FIG. 1b with both a shape filter and frequency compensator 130. The shape filter is configured to multiply the output of the discrete Fourier transform with the terms of a shape filter (s) in the frequency domain. Shape filter 150 is applied after frequency domain transformer 140. If the shape filter is defined by convolutions in the time domain, i.e., on the incoming samples received at batch memory 120, then a Fourier version, suitable for application in the frequency domain may be pre-computed.

The terms of a shape filter may be obtained from the terms of a shape filter in the time domain, by apply a discrete Fourier transform to the time-domain shape filter. If frequency compensation is used, the shape filter should be shifted appropriately, e.g., before transforming the shape filter, first adding a multiple of the frequency compensation term to the phase of the consecutive terms of the shape filter in the time domain, the multiple increasing with each consecutive term. For example given a time domain shape filter s[n] the filter for use in the frequency domain may be given by $S[n] = DFT(s[n] \cdot e^{j2\pi\Delta f_i n})$. In the frequency domain element-wise multiplication is used instead of convolution.

Some standards of wireless telecommunications technology, e.g., used for mobile devices, mobile telecommunication services, networks and the like, require pulse shaping, e.g., to reduce interference between different carriers. Pulse shaping may, for example, be done by applying a shape filter. Examples of pulse shaping filters include: The boxcar filter, Sin c shaped filter, Raised-cosine filter, Gaussian filter, and the like.

In an embodiment, each baseband signal of the plurality has an associated preset location and a frequency compensation term, e.g., stored in a memory of controller 100 or 101. Configurable parameters of controllers 100 and/or 101 may include the batch size B, overlap size O. Also the frequency compensation and preset location may be configurable parameters.

Figure 2:
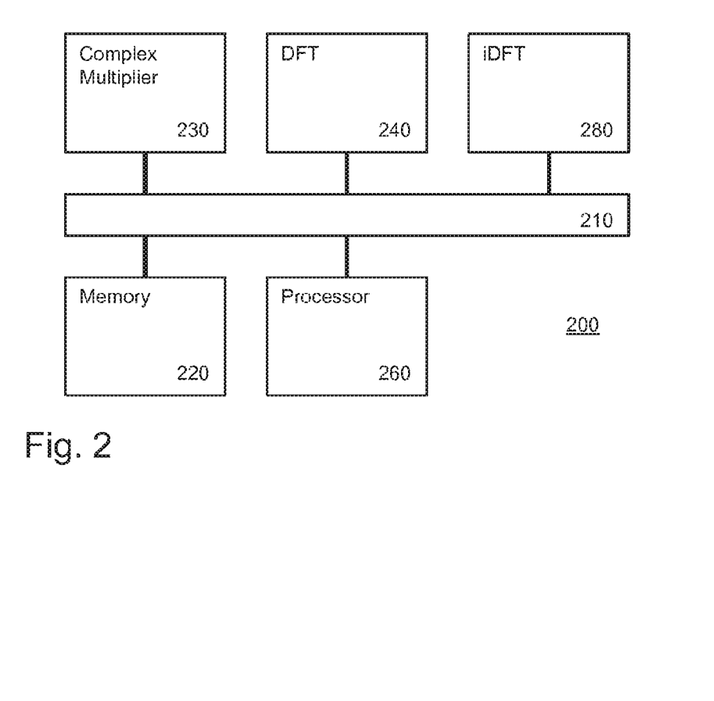

FIG. 2 is schematic illustration of an integrated circuit 200. The integrated circuit has several units: a complex multiplier 230, a DFT unit 240, an inverse DFT unit 280, a memory 220, and a processor 260. These units may be interconnected using an interconnect 210, say a bus. Memory 220 may be used to perform the function of batch memory 120 and accumulating memory 170 and possibly to store parameters such as preset locations, batch number, overlap number etc. complex multiplier 230 may be used to perform the function of frequency compensator 130 and shape filter 150 under control of processor 260. DFT unit 240 may be used to perform the function of frequency domain transformer 140. Inverse DFT unit 280 may be used to perform the function of time domain transformer 180.

As an example, the following parameters are possible: W=64, L=2, B=2048, O=64.

In a carrier aggregation implementation with shape filtering in which the aggregation and shape filtering is done in the time domain, i.e., different from FIG. 1b, about 130 operations per output sample were needed. An implementation of FIG. 1b only required about 27 operations per output sample.

In an embodiment, an integrated circuit comprising a circuitry which comprises input lines for receiving an aggregated baseband signal, and, a carrier aggregation controller for providing the aggregated baseband signal to the input lines of the circuitry.

In an embodiment, the integrated circuit comprises a modulator for modulating a high-frequency carrier signal with the aggregated baseband signal.

For example, in an embodiment, a base station comprises a carrier aggregation controller, possibly, in the form of an integrated circuit.

FIG. 3 schematically shows an aggregated baseband signal obtained from a plurality of baseband signals. The baseband signals are denoted with Carrier 1 to L, having central frequencies $f_1$ to $f_L$. In this case the carriers are non-contiguous. In an embodiment, the aggregated baseband signal is centered at 0.

Figure 4:
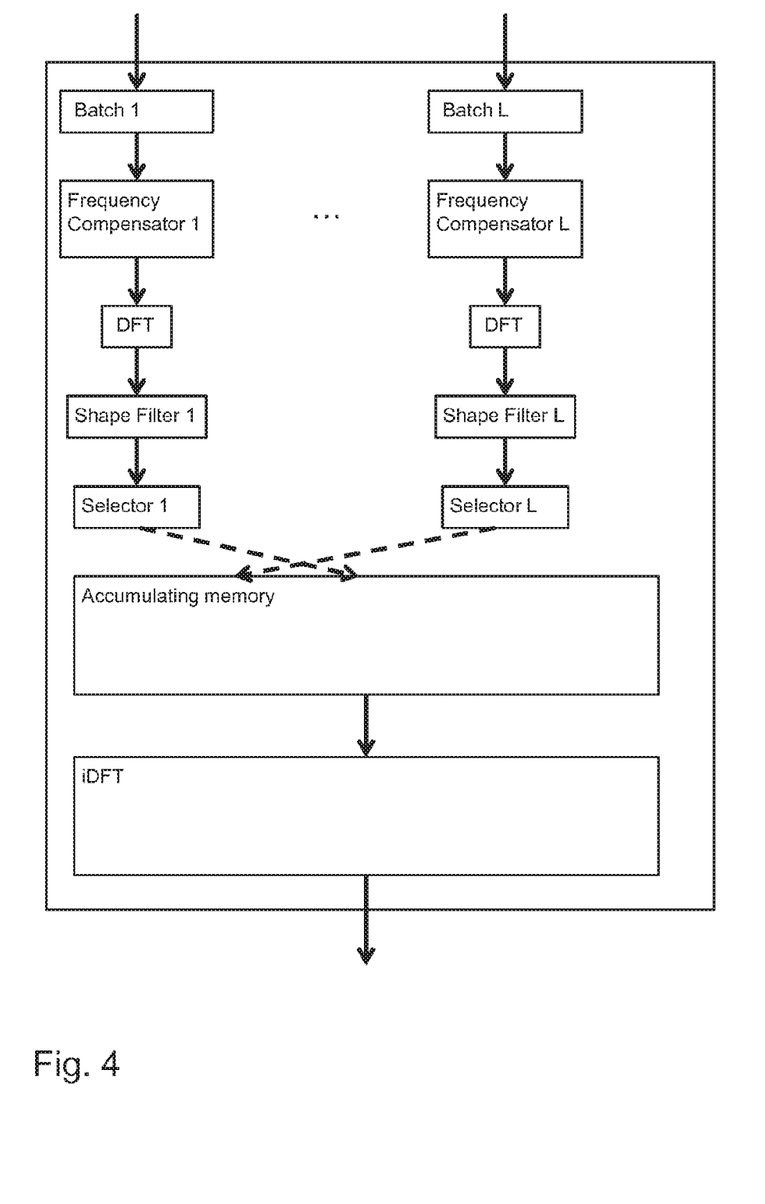

FIG. 4 schematically shows another example of an embodiment of a carrier aggregation controller. A number of L≥2 baseband signals are received, and stored in corresponding batch memories. Shown are two signals (number 1 and number L). The batch memories may be distinct or part of a larger memory.

First B consecutive samples of the carrier baseband signal are collected in the batch memories 1 to L, where the first O samples overlap with the previous block (batch). The samples in the block are multiplied element wise by $e^{j2\pi\Delta f_i n}$, wherein j is the imaginary unit. This causes a phase shift. The number $\Delta f_i$ is associated with signal i, and n increase by 1 with each sample in a particular batch. A B point DFT is performed on the L blocks of B samples each, to obtain L blocks of B transformed samples. The DFT output is multiplied with a shape filter; each element is multiplied with $S[n]=DFT(s[n]\cdot e^{j2\pi\Delta f_i n})$, wherein n increases with the samples in the transformed block. For each base band signal the transformed and possibly filtered samples are added to an accumulating memory at a particular place. The accumulating memory has size L×B. When all signals are added to the accumulating memory, an L×B inverse DFT is performed. Finally an output block selection is done, selecting the last L×(B−O) samples of the iDFT.

Figure 5:
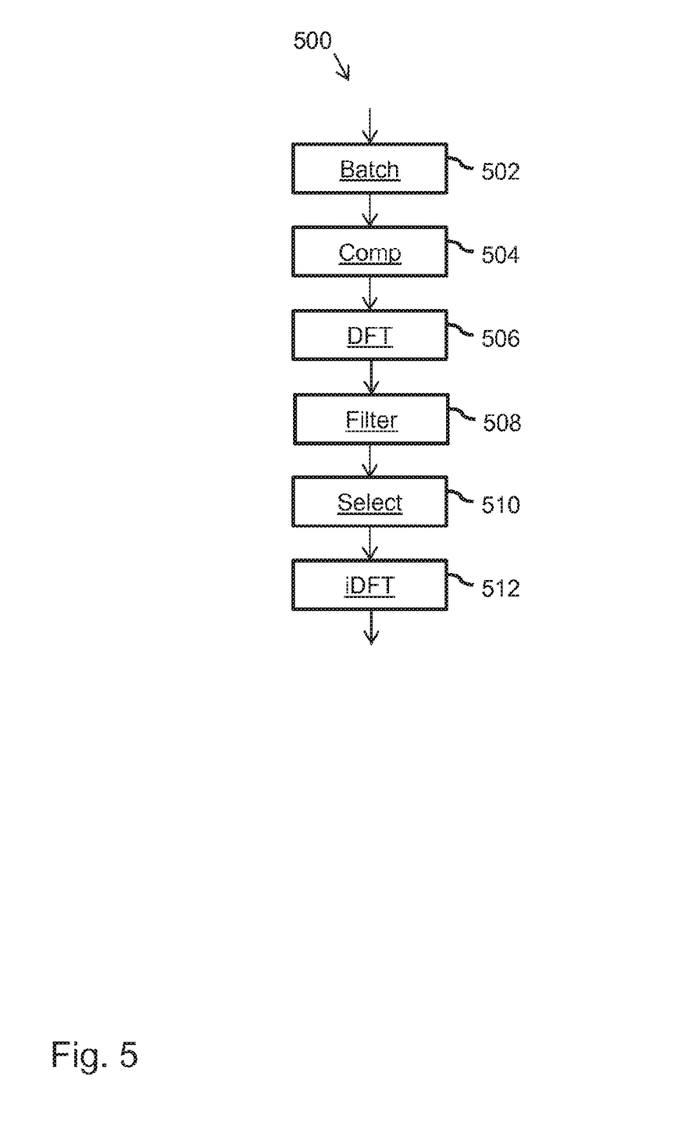

FIG. 5 schematically shows in a flowchart an example of a method of providing an aggregated baseband signal. Box 502 (Batch) represents batching consecutive samples for some or all of a plurality of baseband signals. In box 504 (Comp) represents frequency compensation of the consecutive samples. Boxes 502 and 504 may be interchanged. Box 506 (DFT) represents applying a discrete Fourier transform to the batched and compensated samples. Box 508 (Filter) represents filtering the Fourier transformed samples. The filtering may be a shape filter. Box 510 (Select) represents adding the Fourier transformed and filtered samples and adding them to preset locations in an accumulating memory. Box 512 represents applying an inverse Fourier transform. After the inverse Fourier transform the samples to output may be selection, based on the number of signals in the plurality of baseband signals, and the number of samples in the output of the Fourier transform.

Figure 6:
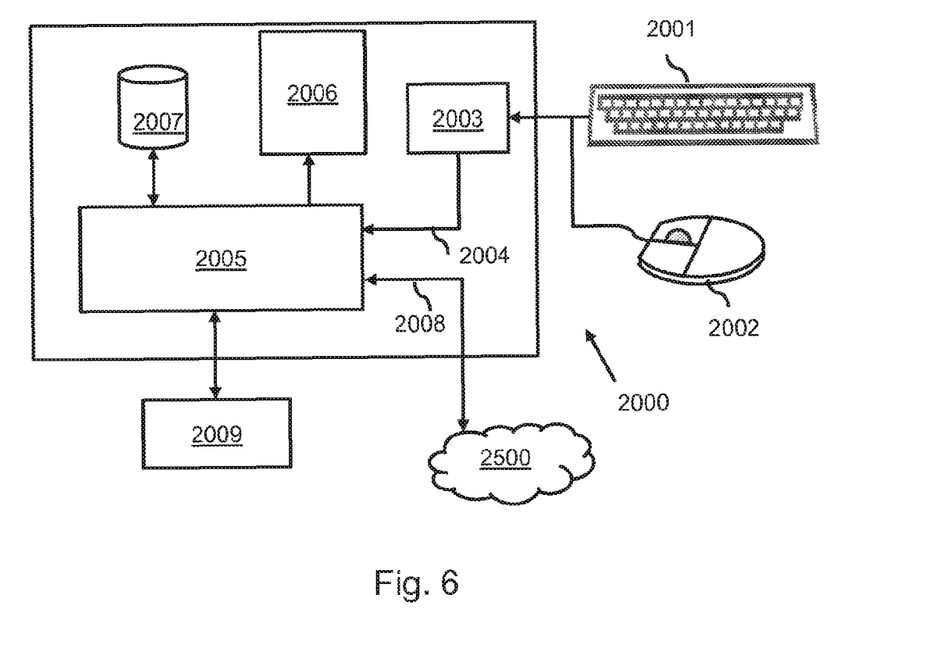

FIG. 6 schematically shows an exemplary user interaction system 2000 having a programmable processor 2005. The user interaction system 2000 is shown to be a personal computer, but may be any type of suitable user interaction system 2000. The programmable processor may comprise one or more components of system 11. The user interaction system 2000 further comprises a storage unit 2007, a user input 2003 and a display 2006, which may be the same as display 521 in FIG. 2 or an additional display. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as lists of frequency domain samples obtained for baseband signals, samples of the aggregated baseband signal or parameters such as preset locations and the like.

The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow creating an aggregated signal by a user. The processor 2005 may also be arranged to retrieve parameters determined during further executions from the storage unit 2007, or from another device in the cloud 2500, and generate a report by the processor 2005. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of providing an aggregated baseband signal from a plurality of baseband signals, the controller comprising adding at least a first list of frequency domain samples obtained for the first baseband signal to consecutive locations in the accumulating memory centered at a first preset location associated with the first baseband signal, and a second list of frequency domain samples obtained for the second baseband signal to consecutive locations in the accumulating memory centered at a second preset location associated with the second baseband signal, and applying at least an inverse discrete Fourier transform to the accumulated frequency domain samples in the accumulating memory, obtaining the aggregated baseband signal.

Figure 7:
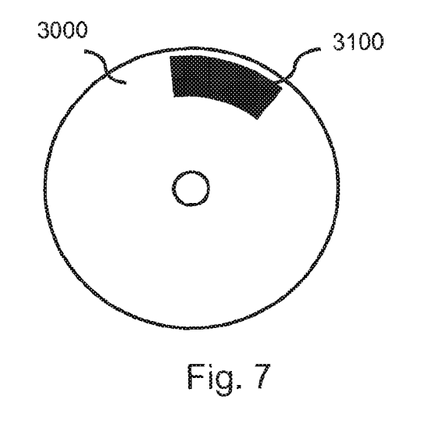
FIG. 7 shows a computer readable medium comprising a computer program product.

FIG. 7 shows a computer readable medium 3000 comprising a computer program product 3100, the computer program product 3100 comprising instructions for causing a processor apparatus to perform a method of a method of providing an aggregated baseband signal from a plurality of baseband signals. The computer program product 3100 may further comprise instructions for causing the processor apparatus to perform transmitting the aggregated signal. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 7 as an optical disc, the computer readable medium 3000 may be any suitable computer readable medium, such as a hard disk, solid state memory, flash memory, etc., and may be non-recordable or recordable.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The integrated circuit may comprises a semiconductor substrate. The semiconductor substrate can be any semiconductor material or combinations of materials, such as gallium arsenide, silicon germanium, silicon-on-insulator (SOI), silicon, monocrystalline silicon, the like, and combinations of the above.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 and/or 101 are circuitry located on a single integrated circuit or within a same device. Alternatively, system 100 and/or 101 may include any number of separate integrated circuits or separate devices interconnected with each other. For example, memory 120 or 170 may be located on a same integrated circuit as units 140 and/or 160 and/or 180 or on a separate integrated circuit or located within another peripheral or slave discretely separate from other elements of system 100 and/or 101. Peripheral 110 and/or 190 may also be located on separate integrated circuits or devices. Also for example, system 100 and/or 101 or portions thereof may be soft or code representations of physical circuitry or of logical representations convertible into physical circuitry. As such, system 100 and/or 101 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100 and/or 101, for example, from computer readable media such as memory 120 or 170 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 100 and/or 101 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A carrier aggregation controller for providing an aggregated baseband signal from a plurality of baseband signals, each baseband signal of the plurality of baseband signals being associated with a respective central frequency of a plurality of central frequencies, the aggregated baseband signal comprising the plurality of baseband signals each centered at the respective central frequency of the plurality of central frequencies, the controller comprising an accumulating memory;
a selector configured to add at least
  a first list of frequency domain samples obtained for a first baseband signal to first consecutive locations in the accumulating memory and
  a second list of frequency domain samples obtained for a second baseband signal to second consecutive locations in the accumulating memory; and
a time domain transformer configured to apply at least an inverse discrete Fourier transform to the frequency domain samples accumulated in the accumulating memory, thereby obtaining the aggregated baseband signal;
wherein the first consecutive locations are centered at a first preset location associated with the first baseband signal, and the second consecutive locations are centered at a second preset location associated with the second baseband signal.

2. A carrier aggregation controller as in claim 1, wherein the locations in the accumulating memory are associated with a frequency ($f_j^b$) linearly dependent upon the location,
  a difference between the frequency associated with the first preset location and the central frequency associated with the first baseband signal is less than a preset margin in absolute value, and a difference between the frequency associated with the second preset location and the central frequency associated with the second baseband signal is less than the preset margin in absolute value.

3. A carrier aggregation controller as in claim 2 wherein the respective frequency associated with each location in the accumulating memory is dependent upon one or more of a sampling rate ($S_b$) of the plurality of baseband signals, the number of baseband signals in the plurality (L), and the number of samples in the first or second list (B).

4. A carrier aggregation controller as in claim 2 wherein the respective frequency ($f_j^b$) associated with a location equals $$-\frac{L \cdot S_b}{2} + j\frac{S_b}{B}$$

wherein
the location is represented with a number j running from 0 to L·B−1,
$S_b$ represents a sampling rate of the plurality of baseband signals,
L represents the number of baseband signals in the plurality of baseband signals, and
B represents the number of samples in the first or second list.

5. A carrier aggregation controller as in claim 2 wherein the preset margin is less than or equal to half the sampling rate of the plurality of baseband signals minus half a carrier bandwidth of the plurality of baseband signals.

6. A carrier aggregation controller as in claim 2 comprising a frequency domain transformer configured to apply at least a discrete Fourier transform to at least a first batch of consecutive samples of the first baseband signal, obtaining at least the first list.

7. A carrier aggregation controller as in claim 6, wherein the first baseband signal is associated to a frequency compensation term determined by the difference between the frequency associated with the first preset location and the central frequency associated with the first baseband signal, the carrier aggregation controller comprising a frequency compensator configured to add a multiple of the frequency compensation term to the phase of each sample of the first batch of the consecutive samples, the multiple increasing with each consecutive sample, the carrier aggregation controller being configured to apply the frequency compensator before applying the discrete Fourier transform.

8. A carrier aggregation controller claim 7, comprising a shape filter, wherein the shape filter is configured to multiply the output of the discrete Fourier transform with the terms of the shape filter in the frequency domain.

9. A carrier aggregation controller as in claim 8, wherein the terms of the shape filter having been obtained from the terms of the shape filter in the time domain, by adding a multiple of the respective frequency compensation term to the phase of the consecutive terms of the shape filter in the time domain, the multiple increasing with each consecutive term, and applying a discrete Fourier transform to the result of the multiplying.

10. A carrier aggregation controller as in claim 6, comprising a batch memory for receiving the first batch of consecutive samples of the first baseband signal until the number of batched samples equals a preset batch-number.

11. A carrier aggregation controller as in claim 10, wherein the batch memory is configured so that consecutive batches have an overlap of a preset overlap-size, after receiving batch-number of consecutive samples in the first batch, retaining a preset number of samples of the first batch in the batch memory and to clear the remaining samples.

12. A carrier aggregation controller as in claim 11, wherein the frequency associated with the first preset location ($f_j^b$), the overlap-size, and the number of samples in the first or second list (B) are chosen so that a continuous output phase between blocks in the aggregated baseband signal is obtained.

13. A carrier aggregation controller as in claim 12 wherein the frequency associated with the first preset location ($f_j^b$) is chosen so that $$\frac{L \cdot (B-O) \cdot f_j^b}{R}$$

is an integer,
wherein $f_j^b$ represents the frequency associated with the first preset location,
R represents a sampling rate of the plurality of baseband signals times the number of baseband signals in the plurality of baseband signals,
L represents the number of baseband signals in the plurality of baseband signals,
B represents the number of samples in the first or second list, and
O represents the number of samples in the overlap.

14. A carrier aggregation controller as in claim 12 wherein the number of samples in the first or second list is a power of 2, and/or the number of samples in the overlap is a power of 2.

15. An integrated circuit comprising
a circuitry which comprises input lines for receiving an aggregated baseband signal,
a carrier aggregation controller according to claim 1 for providing the aggregated baseband signal to the input lines of the circuitry.

16. A base station comprising an integrated circuit according to claim 15.

17. A method for providing an aggregated baseband signal from a plurality of baseband signals, each baseband signal of the plurality of baseband signals being associated with a respective central frequency of a plurality of central frequencies, the aggregated baseband signal comprising the plurality of baseband signals each centered at the respective central frequency of the plurality of central frequencies, the method comprising:
adding at least
a first list of frequency domain samples obtained for a first baseband signal to first consecutive locations in an accumulating memory, and
a second list of frequency domain samples obtained for a second baseband signal to second consecutive locations in the accumulating memory, and
applying at least an inverse discrete Fourier transform to the frequency domain samples accumulated in the accumulating memory, obtaining the aggregated baseband signal;
wherein the first consecutive locations are centered at a first preset location associated with the first baseband signal, and the second consecutive locations are centered at a second preset location associated with the second baseband signal.

\* \* \* \* \*